US009770951B2

(12) United States Patent
 Takahashi

(10) Patent No.: US 9,770,951 B2
(45) Date of Patent: Sep. 26, 2017

(54) PNEUMATIC TIRE

(71) Applicant: The Yokohama Rubber Co., LTD., Minato-ku, Tokyo (JP)

(72) Inventor: Yasuhiro Takahashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/115,397

(22) PCT Filed: Dec. 25, 2014

(86) PCT No.: PCT/JP2014/084437
§ 371 (c)(1),
(2) Date: Jul. 29, 2016

(87) PCT Pub. No.: WO2015/115015
PCT Pub. Date: Aug. 6, 2015

(65) Prior Publication Data
US 2017/0001479 A1    Jan. 5, 2017

(30) Foreign Application Priority Data

Jan. 29, 2014    (JP) ................................. 2014-014207

(51) Int. Cl.
 *B60C 11/13* (2006.01)
 *B60C 11/12* (2006.01)
 *B60C 11/03* (2006.01)
(52) U.S. Cl.
 CPC ...... *B60C 11/1392* (2013.01); *B60C 11/0302* (2013.01); *B60C 11/0311* (2013.01);
 (Continued)
(58) Field of Classification Search
 CPC ............. B60C 11/1392; B60C 11/1353; B60C 11/1369; B60C 2011/1361;
 (Continued)

(56) References Cited

U.S. PATENT DOCUMENTS 6,076,579 A * 6/2000 Matsumoto ......... B60C 11/0309
                                                       152/209.15
7,195,044 B2 * 3/2007 Maxwell .................. B60C 11/11
                                                       152/209.21
(Continued)

FOREIGN PATENT DOCUMENTS

CN    1319509    10/2001
CN    1724280    1/2006
(Continued)

OTHER PUBLICATIONS

English machine translation of JP64-022601, no date.*
(Continued)

*Primary Examiner* — Robert Dye
(74) *Attorney, Agent, or Firm* — Thorpe North & Western

(57) ABSTRACT

A tread portion of a pneumatic tire in which a tread pattern is formed includes: a first circumferential groove extending in a tire circumferential direction; a second circumferential groove outward of the first circumferential groove in a tire width direction; a first lug groove group containing first lug grooves disposed in the tire circumferential direction, each first lug groove extending, inclined with respect to the tire width direction, from the second circumferential groove toward the first circumferential groove; and a second lug groove group containing second lug grooves disposed in the tire circumferential direction, each second lug groove being disposed between the first circumferential groove and the second circumferential groove with both ends disposed at a position spaced apart from the first circumferential groove, the second circumferential groove, and the first lug grooves, and intersecting with at least two of the first lug grooves.

17 Claims, 6 Drawing Sheets

(52) U.S. Cl.
CPC ........ B60C 11/125 (2013.01); B60C 11/1323 (2013.01); *B60C 2011/0341* (2013.01); *B60C 2011/0358* (2013.01); *B60C 2011/0369* (2013.01); *B60C 2011/0372* (2013.01); *B60C 2011/0374* (2013.01); *B60C 2011/0376* (2013.01); *B60C 2011/0381* (2013.01); *B60C 2011/0388* (2013.01); *B60C 2011/1209* (2013.01)

(58) Field of Classification Search
CPC ..... B60C 2011/0381; B60C 2011/0383; B60C 2011/1254
See application file for complete search history.

(56) References Cited

U.S. PATENT DOCUMENTS

| | | | |
|---|---|---|---|
| 2002/0011291 | A1 | 1/2002 | Ikeda |
| 2006/0016536 | A1 | 1/2006 | Maxwell et al. |
| 2007/0000590 | A1* | 1/2007 | Murata ............... B60C 11/0083 152/209.8 |
| 2008/0000564 | A1 | 1/2008 | Mukai |
| 2009/0301621 | A1 | 12/2009 | Matsushita |

FOREIGN PATENT DOCUMENTS

| | | | |
|---|---|---|---|
| CN | 1891500 | | 1/2007 |
| CN | 101096170 | | 1/2008 |
| EP | 0 602 989 | | 6/1994 |
| EP | 0602989 | * | 6/1994 |
| EP | 2689940 | * | 1/2014 |
| JP | S63-0291706 | | 11/1988 |
| JP | S64-022601 | | 1/1989 |
| JP | 64-022601 | * | 2/1989 |
| JP | 02-179508 | * | 7/1990 |
| JP | 05-069706 | * | 3/1993 |
| JP | H05-069706 | | 3/1993 |
| JP | H07-0323705 | | 12/1995 |
| JP | 2000-255220 | * | 9/2000 |
| JP | 2005-161921 | | 6/2005 |
| JP | 2009-292252 | | 12/2009 |
| JP | 2011-240750 | | 12/2011 |
| JP | 2013-139241 | | 7/2013 |
| WO | WO2012/127839 | * | 9/2012 |

OTHER PUBLICATIONS

English machine translation of JP05-069706, no date.*

English machine translation of JP2000-255220, no date.*

English machine translation of JP2013-139241, no date.*

International Search Report for International Application No. PCT/JP2014/084437 dated Mar. 31, 2015, 4 pages, Japan.

* cited by examiner

PNEUMATIC TIRE

TECHNICAL FIELD

The present technology relates to a pneumatic tire having a tread pattern formed in the tread portion.

BACKGROUND ART

Grooves are formed in the tread portion of a pneumatic tire to increase its wet performance. Though a large groove area ratio is vital to improving wet performance, if the groove area ratio is too large, the ground contact area may decrease, thus reducing the grip and steering stability of the tire.

To attempt to fulfill such competing requirements, a configuration including the width and number of circumferential grooves provided in the tread portion and the inclination angle and width of lug grooves has been devised (see, for example, Japanese Unexamined Patent Application Publication No. 2013-139241A).

However, if the ground contact area is increased to improve the steering stability of the pneumatic tire on dry road surfaces, the decreased groove area causes reduced drainage properties and steering stability on wet road surfaces. Alternatively, if the groove area is increased to improve drainage properties, the reduced ground contact area causes reduced steering stability on dry road surfaces.

SUMMARY

The present technology provides a pneumatic tire capable of having good steering stability on both dry road surfaces and wet road surfaces.

One aspect of the present technology is a pneumatic tire. The pneumatic tire comprises:

a tread pattern formed in a tread portion; wherein the tread pattern includes a first circumferential groove extending in a tire circumferential direction and annularly disposed around an entire circumference of the tire;

a second circumferential groove annularly disposed around the entire circumference of the tire outward of the first circumferential groove in a tire width direction;

a first lug groove group containing a plurality of first lug grooves disposed in the tire circumferential direction, each first lug groove extending, inclined with respect to the tire width direction, from the second circumferential groove toward the first circumferential groove; and a second lug groove group containing a plurality of second lug grooves disposed in the tire circumferential direction, each second lug groove being disposed between the first circumferential groove and the second circumferential groove with both ends disposed at a position spaced apart from the first circumferential groove, the second circumferential groove, and the first lug grooves, and intersecting with at least two of the first lug grooves, wherein first chamfers are disposed at portions where side walls of the second lug groove connect with a road contact surface of the tread portion.

Preferably, the first chamfers are constituted by a first inner chamfer connected to the inward side wall in the tire width direction of the second lug groove, and a first outer chamfer connected to the outward side wall in the tire width direction of the second lug groove, and a width in the tire width direction of the first inner chamfer is different from a width in the tire width direction of the first outer chamfer.

Preferably, widths of the first chamfers are from 0.05 to 0.50 times a width of the second lug groove when viewed in a cross section orthogonal to an extending direction of the second lug groove.

Preferably, $0.4 \leq L/W \leq 0.6$ is satisfied, where L is a length in the tire circumferential direction of the second lug groove, and W is a ground contact width of the tire.

Preferably, a third lug groove group is provided containing a plurality of third lug grooves disposed in the tire circumferential direction, each third lug groove that intersects with the second lug groove including a first end disposed at a portion surrounded by the first circumferential groove, the second lug groove, and two adjacent first lug grooves of the plurality of first lug grooves, and a second end disposed at a portion surrounded by the second circumferential groove, the second lug groove, and the two adjacent first lug grooves, the second end intersecting with the second lug groove; wherein second chamfers are disposed at portions where side walls of the third lug groove connect to the road contact surface.

Preferably, the second chamfers are constituted by a second inner chamfer connected to the inward side wall in the tire width direction of the third lug groove, and a second outer chamfer connected to the outward side wall in the tire width direction of the third lug groove, and a width in the tire width direction of the second inner chamfer is different from a width in the tire width direction of the second outer chamfer.

Preferably, widths of the second chamfers are from 0.05 to 0.50 times a width of the third lug groove when viewed in a cross section orthogonal to an extending direction of the third lug groove.

Preferably, an inward end portion in the tire width direction of the third lug groove is disposed at a position in the tire width direction substantially identical with that of the inward end in the tire width direction of the second lug groove.

Preferably, the second lug groove is provided with raised bottom portions which are shallower than other portions in proximity to portions where the second lug groove intersects with the first lug grooves.

Preferably, the first lug groove is provided at both end portions with raised bottom portions which are shallower than a portion where the first lug groove intersects with the second lug groove.

Preferably, a first sipe that connects the end portion adjacent to the first circumferential groove of the first lug groove to the first circumferential groove is provided, the first sipe having a width that is less than that of the first lug groove.

Preferably, the first circumferential groove is disposed spaced apart from a tire center line; and a notch groove is disposed to the tire center line side of the first circumferential groove on an extension line of the first lug groove extending inward in the tire width direction.

Preferably, a second sipe is provided on an extension line of the notch groove extending inward in the tire width direction.

Preferably, the first circumferential groove is disposed spaced apart from the tire center line; and a third sipe is disposed to the tire center line side of the first circumferential groove that opens at both ends to the first circumferential groove and bends at a position to the tire center line side of the first circumferential groove.

Preferably, a fourth sipe is disposed to a tire ground contact edge side of the second circumferential groove that opens at both ends to the second circumferential groove and bends at a position to the tire ground contact edge side of the second circumferential groove.

Preferably, a fourth lug groove group is provided containing a plurality of fourth lug grooves disposed in the tire circumferential direction, each fourth lug groove extending in the tire width direction from the second circumferential groove toward the tire ground contact edge, wherein the openings to the second circumferential groove at both ends of the fourth sipe are disposed at two positions to divide into three equal parts in the tire circumferential direction a wall surface adjacent to the second circumferential groove of blocks divided by the fourth lug grooves disposed to the tire ground contact edge side of the second circumferential groove in the shoulder land portion.

Preferably, fifth lug grooves are provided between adjacent fourth lug grooves of the plurality of fourth lug grooves, the fifth lug grooves extending parallel to the fourth lug grooves and dividing each of the blocks into two in the tire circumferential direction; wherein the fourth sipes and the fifth lug grooves intersect with one another.

The aspects described above can provide good steering stability on both dry road surfaces and wet road surfaces.

DETAILED DESCRIPTION

Embodiments of the present technology will be described below in detail with reference to the drawings.

First Embodiment

Overall Explanation of the Tire

Figure 1:
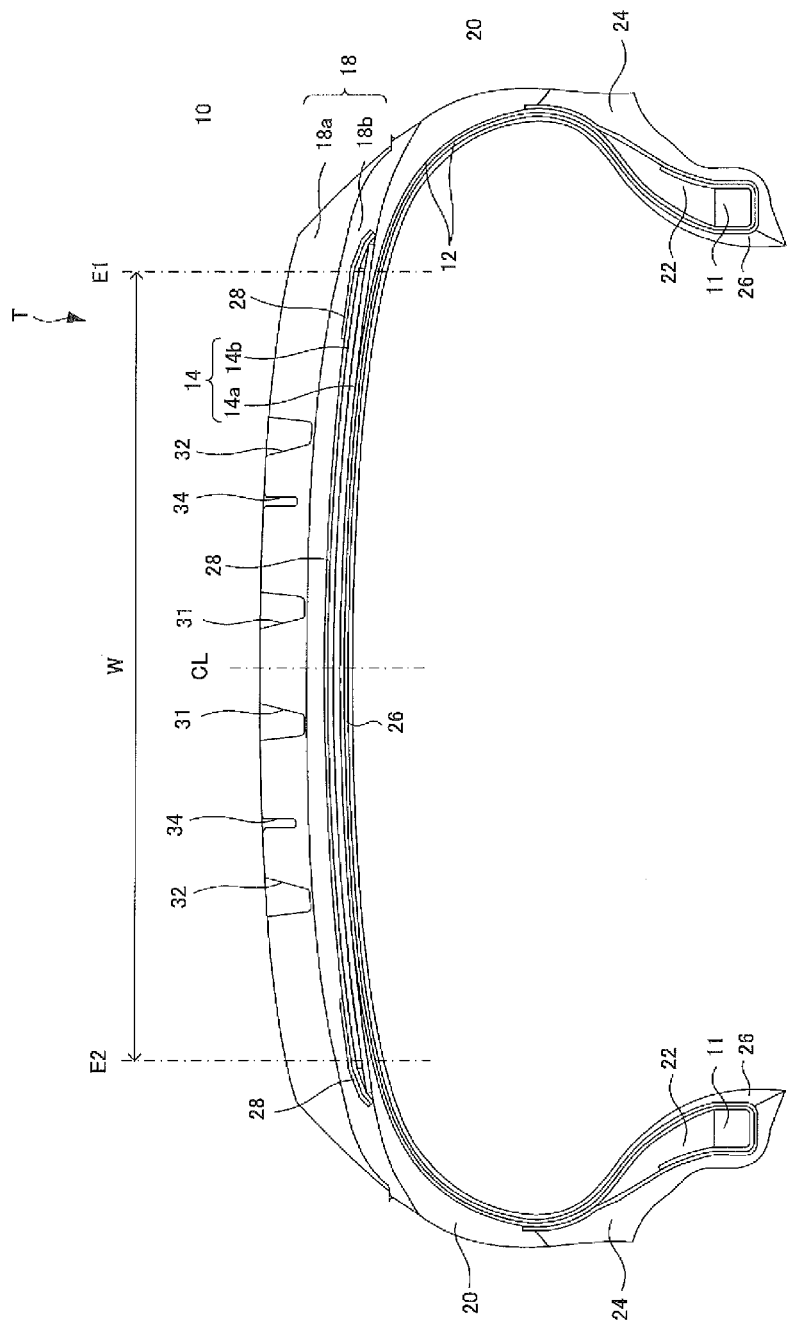
FIG. 1 is a cross-sectional view of a pneumatic tire of a first embodiment of the present technology.

Below, a pneumatic tire of the present embodiment is described. FIG. 1 is a tire cross-sectional view illustrating a cross section of a pneumatic tire (hereinafter referred to as "tire") 10 of the present embodiment.

The tire 10 is, for example, a tire for a passenger vehicle. A tire for a passenger vehicle refers to a tire defined according to Chapter A of the JATMA Yearbook 2012 (standards of The Japan Automobile Tyre Manufacturers Association, Inc.). The tire 10 can also be a small truck tire as defined in Chapter B or a truck tire or bus tire as defined in Chapter C.

Below, values of the dimensions of various pattern elements are described in detail as example values for a tire for a passenger vehicle. However, the pneumatic tire of the present technology is not limited to these example values.

The "tire circumferential direction" described below refers to the direction (both directions) the tread surface rotates when the tire 10 rotates about the tire rotation axis of the tire. The "tire radial direction" refers to the direction that extends radially orthogonal to the tire rotation axis. "Outward in the tire radial direction" refers to the side outward from the tire rotation axis in the tire radial direction. The "Tire width direction" refers to the direction parallel to the tire rotation axis direction. "Outward in the tire width direction" refers to both sides outward from the center line CL of the tire 10.

Tire Structure

The tire 10 mainly includes a pair of bead cores 11, a carcass ply layer 12, and a belt layer 14 as tire skeleton members, and around these tire skeleton members, a tread rubber member 18, sidewall rubber members 20, bead filler rubber members 22, rim cushion rubber members 24, and an innerliner rubber member 26.

The pair of bead cores 11 are annular members disposed at the end portions in the tire width direction, inward in the tire radial direction.

The carcass ply layer 12 includes one or more carcass ply members 12a, 12b, which are made of organic fibers covered with rubber. The carcass ply members 12a, 12b extend between and around the pair of bead cores 11 to form a toroidal form.

The belt layer 14 includes a plurality of belt members 14a, 14b. The belt layer 14 is wound outward of the carcass ply layer 12 in the tire radial direction. The inward belt member 14a in the tire radial direction has a width in the tire width direction greater than the width of the outward belt member 14b in the tire radial direction.

The belt members 14a, 14b are members made of steel cords covered with rubber. The steel cords of the belt members 14a, 14b are disposed inclined at a predetermined angle of from, for example, 20 to 30 degrees, with respect to the tire circumferential direction. The steel cords of the belt members 14a, 14b are inclined in the directions opposite to one another with respect to the tire circumferential direction and cross one another. The belt layer 14 minimizes or prevents expansion of the carcass ply layer 12 caused by the pressure of the air in the tire 10.

The tread rubber member 18 is disposed outward of the belt layer 14 in the tire radial direction. The sidewall rubber members 20 are connected to both end portions of the tread rubber member 18. The tread rubber member 18 is made of two layers: an upper layer tread rubber member 18a disposed outward in the tire radial direction and a lower layer tread rubber member 18b disposed inward in the tire radial direction. The rim cushion rubber members 24 are provided at the inward ends of the sidewall rubber members 20 in the tire radial direction. The rim cushion rubber members 24 come into contact with the rim on which the tire 10 is mounted. The bead filler rubber members 22 are disposed outward of the bead core 11 in the tire radial direction so as to be interposed between the carcass ply layer 12 wound around the bead core 11. The innerliner rubber member 26 is disposed on an inner surface of the tire 10 facing a tire cavity region that is filled with air and is surrounded by the tire 10 and the rim.

In addition, the tire 10 is provided with a belt cover layer 28 that covers the outward surface of the belt layer 14 in the tire radial direction. The belt cover layer 28 is made of organic fibers covered with rubber.

The tire 10 has the tire structure illustrated in FIG. 1. However the pneumatic tire of the present technology is not limited to this structure.

Figure 2:
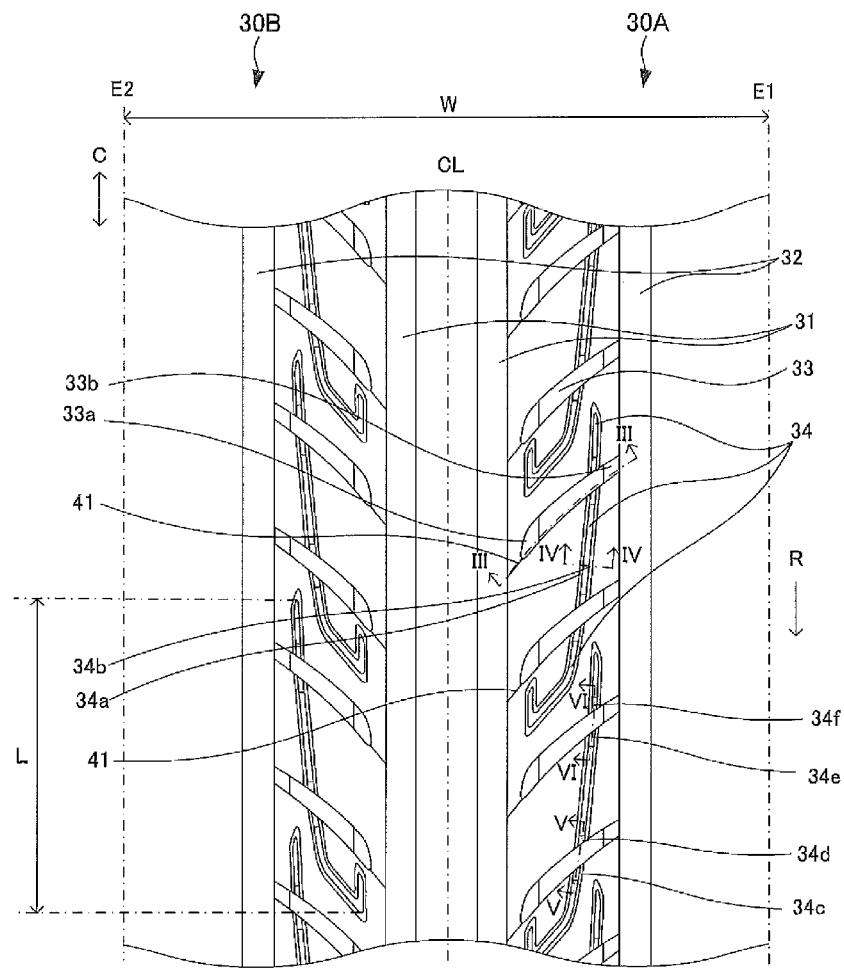
FIG. 2 is a developed view illustrating tread patterns 30A, 30B of the pneumatic tire of the first embodiment.

FIG. 2 is a developed view illustrating tread patterns 30A, 30B of the pneumatic tire 10. As illustrated in FIG. 2, in the tire 10 of the present technology, the tread patterns 30A, 30B, which characterize the present technology, are formed in the tread portion T on either side of the tire center line CL. The tire 10 having the tread patterns 30A, 30B can be beneficially used as a tire for passenger cars.

The tire rotation direction of the tire 10 according to the present technology is predetermined, and the tire 10 is fitted to a vehicle so that the tire 10 rotates in the tire rotation direction R in FIG. 2 when the vehicle is moving forward. Symbols and information indicating this rotational moving direction are displayed on the surfaces of the sidewall rubber members 20 of the tire 10. When the tire 10 rotates in the tire rotation direction R, the tread portion T moves in rotation from top to bottom in FIG. 2, and the position where the tread portion T comes into contact with the road surface moves from bottom to top in FIG. 2.

In FIG. 2, the reference sign CL denotes the tire center line. With the tire 10 fitted to a vehicle, the tread patterns 30A, 30B come into contact with the road surface in a region in the tire width direction indicated by the ground contact width W.

Here, the interval between the ground contact edges E1, E2 is the ground contact width W. The ground contact edges E1, E2 are both end portions in the tire width direction of the ground contact patch when the tire 10 is brought into contact with a horizontal surface under conditions in which the tire 10 is fitted to a specified rim and is inflated to the specified internal pressure, and a load of 80% of the specified load is applied.

In the present technology, the "tire width direction" refers to the rotation axis direction of the tire 10 and is the left-right direction in FIG. 1 and FIG. 2. In addition, the "tire circumferential direction C" refers to the rotation direction R of the tire 10 and the reverse direction thereof, and is a direction perpendicular to the page of FIG. 1 and the up-down direction of FIG. 2.

The tread patterns 30A, 30B illustrated in FIG. 2 are disposed on opposite sides in the width direction of the center line CL. The tread patterns 30A, 30B each includes a first circumferential groove 31, a second circumferential groove 32, a first lug groove group containing a plurality of first lug grooves 33, and a second lug groove group containing a plurality of second lug grooves 34.

The first circumferential groove 31 extends in the tire circumferential direction, is annularly disposed around the entire circumference of the tire, and is spaced apart from the tire center line CL.

The second circumferential groove 32 extends in the tire circumferential direction, is annularly disposed around the entire circumference of the tire, and is spaced apart from the tire center line CL further outward in the tire width direction than the first circumferential groove.

The plurality of first lug grooves 33 and the plurality of second lug grooves 34 are disposed in the region between the first circumferential groove 31 and the second circumferential groove 32.

The first lug groove 33 extends from the second circumferential groove 32 toward the first circumferential groove 31 inclined with respect to the tire width direction. The inward end portion in the tire width direction of the first lug grooves 33 is spaced apart from the first circumferential groove 31. Note that a first sipe 41 that connects the inward end portion in the tire width direction of the first lug grooves 33 to the first circumferential groove 31 may be disposed. In such a case, the width of the first sipe 41 is less than that of the first lug groove 33.

Figure 3:
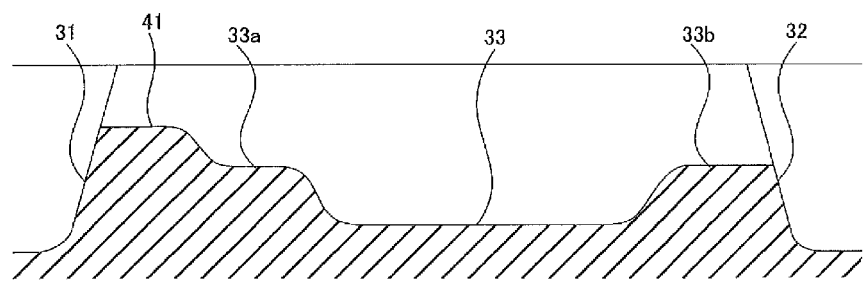
FIG. 3 is a cross-sectional view taken along the line of FIG. 2.

FIG. 3 is a cross-sectional view taken along the line of FIG. 2. In the first lug groove 33, as illustrated in FIG. 3, raised bottom portions 33a, 33b, which are shallower than the center portion of the first lug groove 33, may be disposed at the end portion adjacent to the first circumferential groove 31 and the end portion adjacent to the second circumferential groove 32. The raised bottom portions 33a, 33b can suppress a decrease in rigidity of the blocks which are the land portions between the first circumferential groove 31 and the second circumferential groove 32 divided in the tire circumferential direction by the first lug grooves 33.

The second lug groove 34 are disposed between the first circumferential groove 31 and the second circumferential groove 32 with both ends spaced apart from the first circumferential groove 31, the second circumferential groove 32, and the first lug grooves 33. The second lug groove 34 also intersects with at least two first lug grooves 33. The width of the second lug groove 34 is less than that of the first lug groove 33. The length L of the second lug grooves 34 in the tire circumferential direction and the ground contact width W preferably have a relationship such that $0.4 \leq L/W \leq 0.6$ is satisfied. By satisfying this relationship, the tire 10 can have improved drainage performance.

Figure 4:
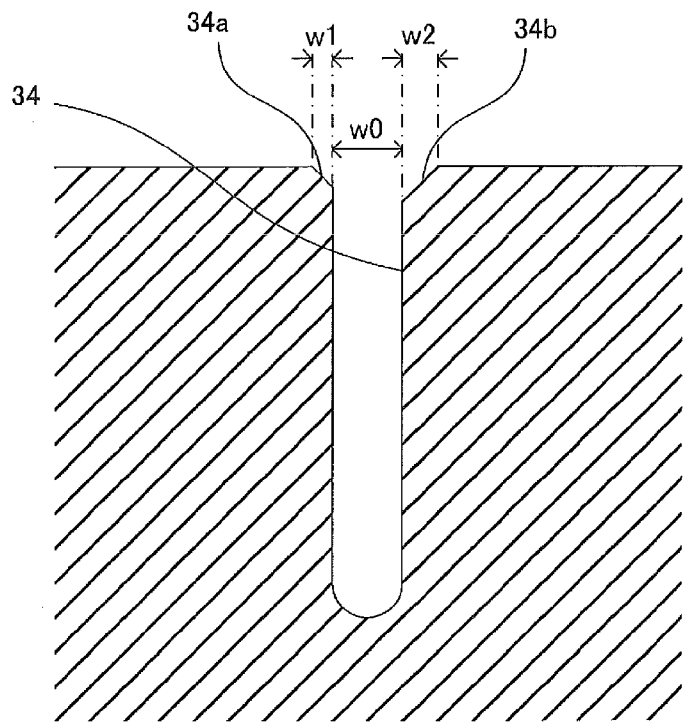
FIG. 4 is a cross-sectional view taken along the line IV-IV of FIG. 2.

FIG. 4 is a cross-sectional view taken along the line IV-IV of FIG. 2. As illustrated in FIG. 4, first chamfers (first inner chamfer 34a and first outer chamfer 34b) are disposed at the portions where the side walls of the second lug groove 34 connect with the road contact surface of the tread portion.

The first chamfers are constituted by the first inner chamfer 34a connected to the inward side wall in the tire width direction of the second lug groove 34 and the first outer chamfer 34b connected to the outward side wall in the tire width direction of the second lug groove 34. The first chamfers allow the groove area ratio to be increased while maintaining the ground contact area when the tire 10 rotates, thus improving the drainage performance while maintaining steering stability.

The width of the first inner chamfer 34a in the tire width direction may be identical with the width of the first outer chamfer 34b in the tire width direction, however the widths are preferably different. The width of the first outer chamfer 34b in the tire width direction is preferably greater than the width of the first inner chamfer 34a in the tire width direction. The first outer chamfer 34b having a greater width in the tire width direction allows the ground contact area to be increased when the tire 10 rotates, thus providing good steering stability.

The widths of the first chamfers (width w1 of the first inner chamfer 34a and width w2 of the first outer chamfer 34b) are preferably from 0.05 to 0.50 times the width w0 of the second lug groove 34 when viewed in a cross section orthogonal to the extending direction of the second lug groove 34. By satisfying this relationship, the effects of increasing the groove area ratio can be sufficiently obtained and good steering stability can also be obtained.

Figure 5:
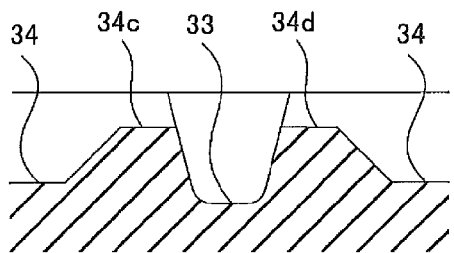
FIG. 5 is a cross-sectional view taken along the line V-V of FIG. 2.
Figure 6:
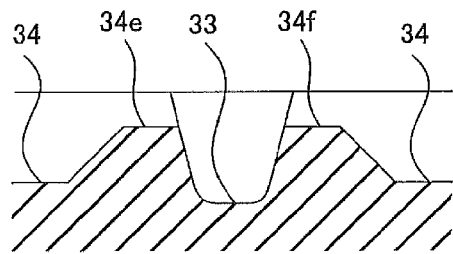
FIG. 6 is a cross-sectional view taken along the line VI-VI of FIG. 2.

FIG. 5 is a cross-sectional view taken along line V-V of FIG. 2. FIG. 6 is a cross-sectional view taken along line VI-VI of FIG. 2. As illustrated in FIG. 5 and FIG. 6, raised bottom portions 34c, 34d, 34e, 34f, which are shallower than other portions, are disposed in the second lug groove 34 in proximity to the portions where the second lug groove 34 intersects with the first lug grooves 33. The raised bottom portions 34c, 34d, 34e, 34f can suppress a decrease in rigidity of the blocks which are the land portions between the first circumferential groove 31 and the second circumferential groove 32 divided in the tire width direction by the second lug grooves 34.

Note that, though not illustrated in FIG. 2, grooves and/or sipes may be disposed closer to the tire center line CL than the first circumferential groove 31. In addition, though not illustrated in FIG. 2, grooves and/or sipes with discretionary shapes may be further disposed outward of the second circumferential groove 32 in the tire width direction.

Second Embodiment

Figure 7:
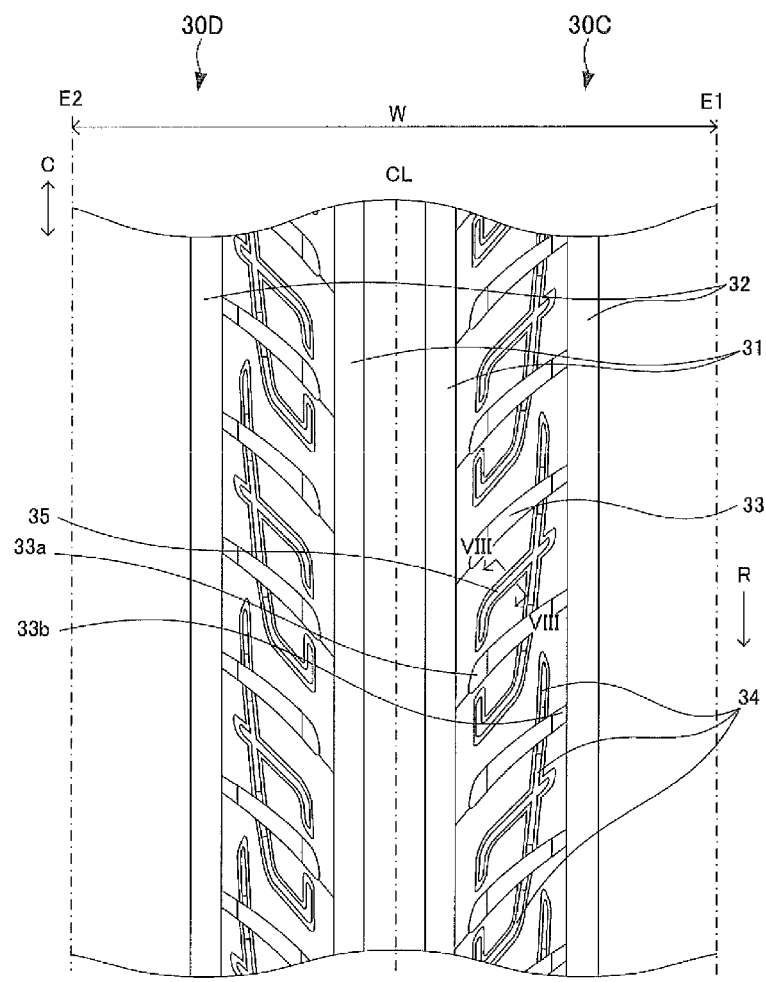
FIG. 7 is a developed view illustrating tread patterns 30C, 30D according to a second embodiment of the present technology.

FIG. 7 is a developed view illustrating tread patterns 30C, 30D according to the second embodiment of the present technology. The tread patterns 30C, 30D are disposed on opposite sides in the width direction of the center line CL. The tread patterns 30C, 30D each include the first circumferential groove 31, the second circumferential groove 32, the first lug grooves 33, and the second lug grooves 34, and further include a third lug groove group containing a plurality of third lug grooves 35 disposed in the tire circumferential direction. Note that the first circumferential groove 31, the second circumferential groove 32, the first lug groove 33, and the second lug groove 34 correspond to those described in the first embodiment, and as such, description thereof is omitted.

The third lug groove 35 intersects with the second lug groove 34. The inward end portion in the tire width direction of the third lug groove 35 is disposed in a portion surrounded by the first circumferential groove 31, two of the first lug grooves 33 adjacent in the tire circumferential direction, and the second lug groove 34. The inward end portion in the tire width direction of the third lug groove 35 is preferably disposed at a position in the tire width direction substantially identical with that of the inward first end in the tire width direction of the second lug groove 34. When disposed as such, the inward first end in the tire width direction of the third lug groove 35 and the inward first end in the tire width direction of the second lug groove 34 oppose one another on opposite sides in the tire circumferential direction of the raised bottom portion 33a of the first lug groove 33. Thus, the blocks which are the land portions between the first circumferential groove 31 and the second circumferential groove 32 divided in the circumferential direction by the first lug grooves 33 are not divided by the second lug grooves 34 and the third lug grooves 35 at the portions inward in the tire width direction of the inward end portions in the tire width direction of the second lug grooves 34, and the portions inward in the tire width direction of the inward end portions in the tire width direction of the third lug grooves 35. As a result, the rigidity of the land portions is increased.

The outward end portion in the tire width direction of the third lug groove 35 is disposed in a portion surrounded by the second circumferential groove 32, two of the first lug grooves 33 adjacent in the tire circumferential direction, and the second lug groove 34.

Figure 8:
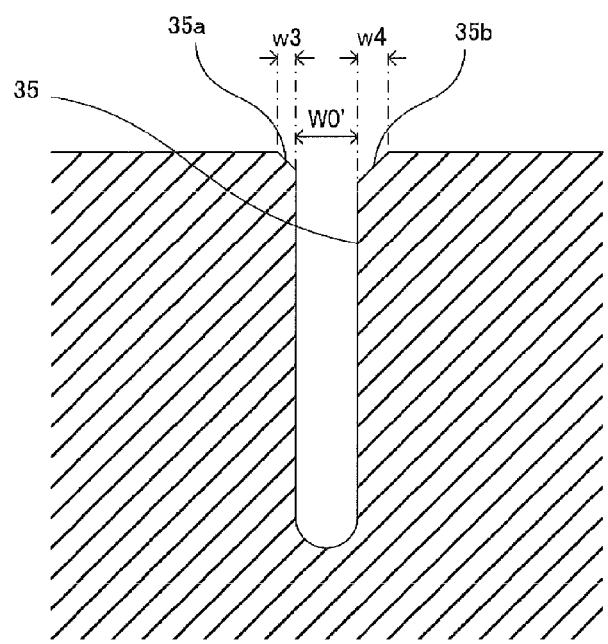
FIG. 8 is a cross-sectional view taken along the line VIII-VIII of FIG. 7.

FIG. 8 is a cross-sectional view taken along the line VIII-VIII of FIG. 7. As illustrated in FIG. 8, second chamfers (second inner chamfer 35a and second outer chamfer 35b) are disposed at the portions where the side walls of the third lug groove 35 connect with the road contact surface.

The second chamfers are constituted by the second inner chamfer 35a connected to the inward side wall in the tire width direction of the third lug groove 35 and the second outer chamfer 35b connected to the outward side wall in the tire width direction of the third lug groove 35. The second chamfers allow the groove area ratio to be increased while maintaining the ground contact area when the tire 10 rotates, thus improving the drainage performance while maintaining steering stability.

The width of the second inner chamfer 35a in the tire width direction may be identical with the width of the second outer chamfer 35b in the tire width direction, however the widths are preferably different. The width of the second outer chamfer 35b in the tire width direction is preferably greater than the width of the second inner chamfer 35a in the tire width direction. The second outer chamfer 35b having a greater width in the tire width direction allows the ground contact area to be increased when the tire 10 rotates, thus providing good steering stability.

The widths of the second chamfers (width w3 of the second inner chamfer 35a and width w4 of the second outer chamfer 35b) are preferably from 0.05 to 0.50 times the width w0' of the second lug groove 34 when viewed in a cross section orthogonal to the extending direction of the third lug groove 35. By satisfying this relationship, the effects of increasing the groove area ratio can be sufficiently obtained and good steering stability can also be obtained.

Modified Example

Figure 9:
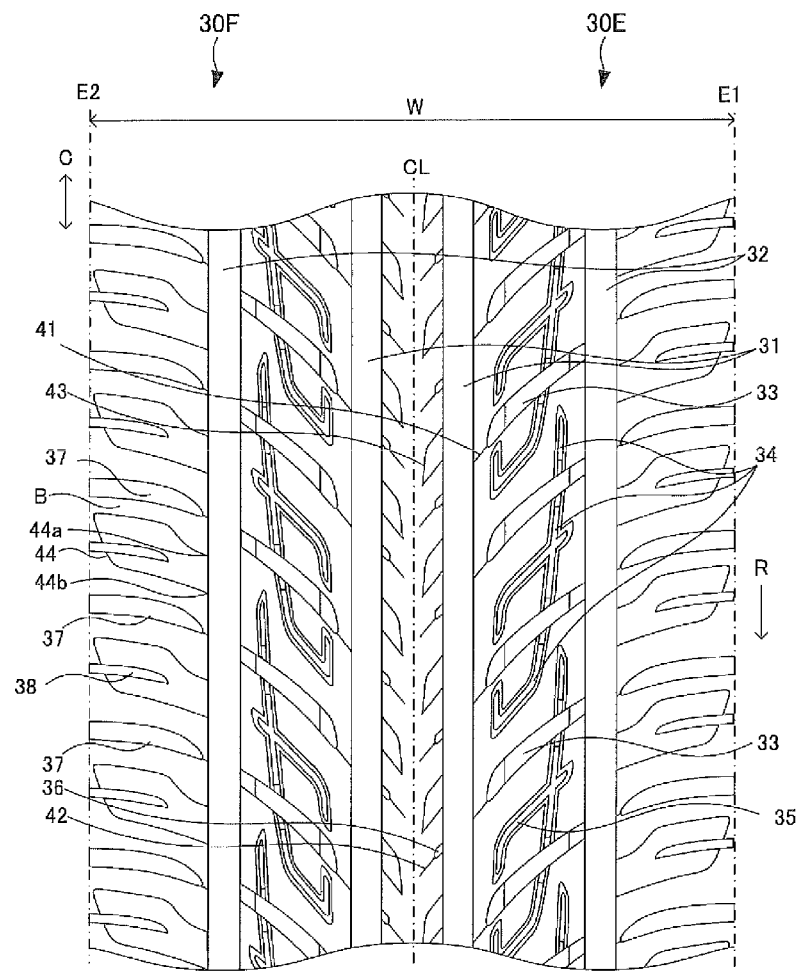
FIG. 9 is a developed view illustrating tread patterns 30E, 30F according to a modified example of the present technology.

FIG. 9 is a developed view illustrating tread patterns 30E, 30F according to a modified example of the present technology. Note that the first circumferential groove 31, the second circumferential groove 32, the first lug groove 33, the second lug groove 34, and the third lug groove 35 correspond to those described in the second embodiment, and as such, description thereof is omitted.

As illustrated in FIG. 9, a notch groove 36 may be disposed in the land portion to the tire center line CL side of the first circumferential groove 31 on the extension line of the first lug groove 33 extending inward in the tire width direction. The notch groove 36 disposed on the extension line of the first lug groove 33 allows the performance on snow of the tire 10 to be improved.

Additionally, a second sipe 42 may be disposed on the extension line of the notch groove 36 extending inward in the tire width direction. The second sipe 42 allows the performance on ice of the tire 10 to be improved.

A third sipe 43 may be disposed in the land portion to the tire center line CL side of the first circumferential groove 31. The third sipe 43 opens at both ends to the first circumferential groove 31 and includes a bent portion that bends at a position to the tire center line CL side of the first circumferential groove 31. The third sipe 43 allows the performance on ice of the tire 10 to be further improved.

Additionally, a fourth sipe 44 may be disposed to the tire ground contact edge E1, E2 side of the second circumferential groove 32. The fourth sipe 44 opens at both ends to the second circumferential groove 32 and includes a bent portion that bends at a position to the tire ground contact edge E1, E2 side of the second circumferential groove 32. The fourth sipe 44 allows the performance on ice of the tire 10 to be further improved.

Additionally, a fourth lug groove group containing a plurality of fourth lug grooves 37 disposed in the tire circumferential direction may be disposed, each of the fourth lug grooves 37 extending in the tire width direction from the tire ground contact edge side toward the second circumferential groove 32. In such a case, the openings 44a, 44b, to the second circumferential groove 32, of both end portions of the fourth sipe 44 are preferably disposed at positions to divide, into three equal parts in the tire circumferential direction, the side adjacent to the second circumferential groove 32 of the blocks B divided in the tire circumferential direction by the plurality of fourth lug grooves 37 disposed to the tire ground contact edge E1, E2 side of the second circumferential groove 32 in the shoulder land portion.

Additionally, a fifth lug groove 38 may be disposed between adjacent fourth lug grooves 37. The fifth lug groove 38 extends parallel to the fourth lug grooves 37 and divides each of the blocks B into two in the tire circumferential direction. In such a case, the fourth sipe 44 and the fifth lug groove 38 may intersect with one another.

Experiment Examples

In order to investigate the effect of the tread patterns 30A, 30B of the tire 10 according to the present technology, tires were produced provided with tread patterns conforming to the specifications shown in Table 1 and their performances were evaluated.

The tire size was 215/45R17.

In the tires of Working Examples 1 to 8, the first circumferential groove 31, the second circumferential groove 32, the first lug grooves 33, the second lug grooves 34, and the third lug grooves 35 were formed in the tread portion T in a similar manner to that illustrated in FIG. 7. The ratio w2/w0 of the maximum width of the first chamfer (width w2 of the first outer chamfer 34b) to the width w0 of the second lug groove 34 is shown in Table 1. The ratio w4/w0' of the maximum width of the second chamfer (width w4 of the second outer chamfer 35b) to the width 0' of the third lug groove 35 is also shown in Table 1.

The conventional example was a tire having a similar tread pattern to that illustrated in FIG. 2 of Japanese Unexamined Patent Application Publication No. 2013-139241A.

The comparative example was a tire having a tread pattern similar to that illustrated in FIG. 7 but without the first chamfers and the second chamfers.

The performance of the tires made as described above was evaluated as follows for dry steering stability and wet steering stability.

Dry Steering Stability

A passenger vehicle mounted with the tires described above was driven on a dry road surface test course. The driver then performed a sensory evaluation of the steering stability performance.

Wet Steering Stability

A passenger vehicle mounted with the tires described above was driven on a test course with a 10 mm film of water covering the road surface. The driver then performed a sensory evaluation of the steering stability performance.

For the sensory evaluation, a 100-point standard evaluation was performed for each tire, and the evaluation results of each working example and comparative example were indexed, with the sensory evaluation result of the conventional example shown below taken as an index value of 100 (reference value). A higher index value indicates better steering stability.

The vehicle used to evaluate the tire performance was a front wheel drive vehicle with a 2000 cc class engine displacement. The inner pressure of all of the front wheels and the rear wheels was set to 230 kPa.

The evaluation results are shown in Table 1.

TABLE 1

|  | Conventional Example | Comparative Example | Working Examples | | | | | | | |
| --- | --- | --- | --- | --- | --- | --- | --- | --- | --- | --- |
|  |  |  | 1 | 2 | 3 | 4 | 5 | 6 | 7 | 8 |
| w2/w0 | 0 | 0 | 0.03 | 0.05 | 0.50 | 0.60 | 0.30 | 0.30 | 0.30 | 0.30 |
| w4/w0' | 0 | 0 | 0.30 | 0.30 | 0.30 | 0.30 | 0.03 | 0.05 | 0.50 | 0.60 |
| Dry steering stability | 100 | 90 | 100 | 100 | 98 | 90 | 100 | 105 | 110 | 110 |
| Wet steering stability | 100 | 90 | 103 | 105 | 110 | 110 | 105 | 105 | 105 | 100 |

Working Examples 1 to 8 had better dry and wet steering stability than the conventional example and comparative example, which did not include chamfers at the second lug grooves 34 and the third lug grooves 35.

When comparing Working Examples 1 to 4, it is clear that by raising the value of w2/w0, the dry steering stability decreases but the wet steering stability increases. Also, it is clear that by setting the value of w2/w0 to a value from 0.05 to 0.50, dry steering stability can be kept at a level of performance close to that of the conventional example while the wet steering stability is increased beyond that of the conventional example.

When comparing Working Examples 5 to 8, it is clear that by raising the value of w4/w0', the dry steering stability increases but the wet steering stability decreases. Also, it is clear that by setting the value of w4/w0' to a value from 0.05 to 0.50, the dry steering stability and the wet steering stability can both be improved.

The foregoing has been a detailed description of the pneumatic tire of the present technology. However, the present technology is naturally not limited to the above embodiments, but may be improved or modified in various ways within the scope of the present technology.

The invention claimed is:

1. A pneumatic tire comprising:
a tread portion in which a tread pattern is formed; wherein the tread portion includes:
a first circumferential groove extending in a tire circumferential direction and annularly disposed around an entire circumference of the tire;

a second circumferential groove annularly disposed around the entire circumference of the tire outward of the first circumferential groove in a tire width direction;

a first lug groove group containing a plurality of first lug grooves disposed in the tire circumferential direction, each first lug groove extending, inclined with respect to the tire width direction, from the second circumferential groove toward the first circumferential groove; and a second lug groove group containing a plurality of second lug grooves disposed in the tire circumferential direction, each second lug groove being disposed between the first circumferential groove and the second circumferential groove with both ends disposed at a position spaced apart from the first circumferential groove, the second circumferential groove, and the first lug grooves, and intersecting with at least two of the first lug grooves, wherein first chamfers are disposed at portions where side walls of each second lug groove connect with a road contact surface of the tread portion, and no chamfer is disposed at portions where side walls of each first lug groove connect with the road contact surface.

2. The pneumatic tire according to claim 1, wherein
the first chamfers are constituted by a first inner chamfer connected to an inward side wall in the tire width direction of each second lug groove, and a first outer chamfer connected to an outward side wall in the tire width direction of each second lug groove, and
a width in the tire width direction of the first inner chamfer is different from a width in the tire width direction of the first outer chamfer.

3. The pneumatic tire according to claim 1, wherein widths of the first chamfers are from 0.05 to 0.50 times a width of each second lug groove when viewed in a cross section orthogonal to an extending direction of each second lug groove.

4. The pneumatic tire according to claim 1, wherein $0.4 \leq L/W \leq 0.6$ is satisfied, where L is a length in the tire circumferential direction of each second lug groove, and W is a ground contact width of the tire.

5. The pneumatic tire according to claim 1, further comprising
a third lug groove group containing a plurality of third lug grooves disposed in the tire circumferential direction, each third lug groove that intersects with one of the second lug grooves including:
a first end disposed at a portion surrounded by the first circumferential groove, one of the second lug grooves, and two adjacent first lug grooves of the plurality of first lug grooves, and
a second end disposed at a portion surrounded by the second circumferential groove, one of the second lug grooves, and the two adjacent first lug grooves; wherein
second chamfers are disposed at portions where side walls of the third lug groove connect to the road contact surface.

6. The pneumatic tire according to claim 5, wherein
the second chamfers are constituted by a second inner chamfer connected to an inward side wall in the tire width direction of the third lug groove, and a second outer chamfer connected to an outward side wall in the tire width direction of the third lug groove, and
a width in the tire width direction of the second inner chamfer is different from a width in the tire width direction of the second outer chamfer.

7. The pneumatic tire according to claim 5, wherein widths of the second chamfers are from 0.05 to 0.50 times a width of the third lug groove when viewed in a cross section orthogonal to an extending direction of the third lug groove.

8. The pneumatic tire according to claim 5, wherein an inward end portion in the tire width direction of the third lug groove is disposed at a position in the tire width direction substantially identical with that of the inward end in the tire width direction of each second lug groove.

9. The pneumatic tire according to claim 1, wherein each second lug groove is provided with raised bottom portions which are shallower than other portions in proximity to portions where each second lug groove intersects with the first lug grooves.

10. The pneumatic tire according to claim 1, wherein each first lug groove is provided at both end portions with raised bottom portions which are shallower than a portion where each first lug groove intersects with one of the second lug grooves.

11. The pneumatic tire according to claim 1, further comprising a first sipe that connects an end portion adjacent to the first circumferential groove of one of the first lug grooves to the first circumferential groove, the first sipe having a width that is less than that of the first lug groove.

12. The pneumatic tire according to claim 1, wherein the first circumferential groove is disposed spaced apart from a tire center line; and further comprising a notch groove disposed to a tire center line side of the first circumferential groove on an extension line of one of the first lug grooves extending inward in the tire width direction.

13. The pneumatic tire according to claim 12, further comprising a center extension sipe on an extension line of the notch groove extending inward in the tire width direction.

14. The pneumatic tire according to claim 1, wherein the first circumferential groove is disposed spaced apart from a tire center line; and further comprising a center bend sipe disposed to a tire center line side of the first circumferential groove that opens at both ends to the first circumferential groove and bends at a position to the tire center line side of the first circumferential groove.

15. The pneumatic tire according to claim 1, further comprising a shoulder sipe disposed to a tire ground contact edge side of the second circumferential groove that opens at both ends to the second circumferential groove and bends at a position to the tire ground contact edge side of the second circumferential groove.

16. A pneumatic tire comprising:
a tread portion in which a tread pattern is formed; wherein the tread portion includes:
a first circumferential groove extending in a tire circumferential direction and annularly disposed around an entire circumference of the tire;
a second circumferential groove annularly disposed around the entire circumference of the tire outward of the first circumferential groove in a tire width direction;
a first lug groove group containing a plurality of first lug grooves disposed in the tire circumferential direction, each first lug groove extending, inclined with respect to the tire width direction, from the second circumferential groove toward the first circumferential groove;
a second lug groove group containing a plurality of second lug grooves disposed in the tire circumferential direction, each second lug groove being disposed between the first circumferential groove and the second circumferential groove with both ends disposed at a position spaced apart from the first circumferential groove, the second circumferential groove, and the first lug grooves, and intersecting with at least two of the first lug grooves, wherein first chamfers are disposed at portions where side walls of each second lug groove connect with a road contact surface of the tread portion;

a shoulder sipe disposed to a tire ground contact edge side of the second circumferential groove that opens at both ends to the second circumferential groove and bends at a position to the tire ground contact edge side of the second circumferential groove; and a fourth lug groove group containing a plurality of fourth lug grooves disposed in the tire circumferential direction, each fourth lug groove extending in the tire width direction from the second circumferential groove toward the tire ground contact edge, wherein the openings to the second circumferential groove at both ends of the shoulder sipe are disposed at two positions to divide into three equal parts in the tire circumferential direction a wall surface adjacent to the second circumferential groove of blocks divided by the fourth lug grooves disposed to the tire ground contact edge side of the second circumferential groove in a shoulder land portion.

17. The pneumatic tire according to claim 16, further comprising fifth lug grooves between adjacent fourth lug grooves of the plurality of fourth lug grooves, the fifth lug grooves extending parallel to the fourth lug grooves and dividing each of the blocks into two in the tire circumferential direction; wherein the shoulder sipe and one of the fifth lug grooves intersect with one another.

* * * * *